United States Patent
Kunasekaran et al.

(10) Patent No.: US 12,529,727 B2
(45) Date of Patent: Jan. 20, 2026

(54) SYSTEM AND METHOD FOR AUTOMATIC DETECTION OF A BATTERY TYPE IN BATTERY OPERATED DEVICES

(71) Applicant: Lennox Industries Inc., Richardson, TX (US)

(72) Inventors: Arun Kunasekaran, Periyakuppam (IN); Mohan Renganathan, Chennai (IN)

(73) Assignee: Lennox Industries Inc., Richardson, TX (US)

( * ) Notice: Subject to any disclaimer, the term of this patent is extended or adjusted under 35 U.S.C. 154(b) by 277 days.

(21) Appl. No.: 18/496,053

(22) Filed: Oct. 27, 2023

(65) Prior Publication Data

US 2025/0138098 A1    May 1, 2025

(51) Int. Cl.
*G01R 31/3835*    (2019.01)
(52) U.S. Cl.
CPC ................................ *G01R 31/3835* (2019.01)
(58) Field of Classification Search
CPC .................................................. G01R 31/3835
See application file for complete search history.

(56) References Cited

U.S. PATENT DOCUMENTS

2016/0291092 A1*  10/2016  Jonsson ................... H02J 7/35
2019/0252736 A1*  8/2019  Miska ............... H01M 10/4221

FOREIGN PATENT DOCUMENTS

JP        H11191437 A  *  7/1999  ............ H01M 10/48

OTHER PUBLICATIONS

English translate JP H11191437 A (Year: 1999).*

* cited by examiner

*Primary Examiner* — Eman A Alkafawi
*Assistant Examiner* — Courtney G Mcdonnough
(74) *Attorney, Agent, or Firm* — Baker Botts L.L.P.

(57) ABSTRACT

The provided systems and methods may compare an initial terminal voltage of a battery to a first initial voltage threshold and a second initial voltage threshold. The provided systems and methods may determine whether the initial terminal voltage of the one or more batteries is lower than the first initial voltage threshold and if the initial terminal voltage of the one or more batteries is greater than the second initial voltage threshold. The provided systems and methods may then confirm that the one or more batteries corresponds to a first battery type if the initial terminal voltage is less than the first initial voltage threshold and confirm that the one or more batteries corresponds to a second battery type if the initial terminal voltage is greater than the second initial voltage threshold.

20 Claims, 8 Drawing Sheets

SYSTEM AND METHOD FOR AUTOMATIC DETECTION OF A BATTERY TYPE IN BATTERY OPERATED DEVICES

TECHNICAL FIELD

This disclosure relates generally to electromechanical devices. More particularly, this disclosure relates to a system and method for automatic detection of a battery type in battery operated devices.

BACKGROUND

Many battery-operated devices, such as sensor devices for heating, ventilation, and air conditioning (HVAC) systems, are designed to use lithium batteries to avoid frequent battery replacement. However, users often mistakenly use alkaline batteries instead of lithium batteries. Due to differences in discharge characteristics between the lithium batteries and the alkaline batteries, the software for estimating the battery capacity may be inaccurate when an alkaline battery is used in a battery-operated device designed for lithium batteries. This results in an improper battery warning or an incident where the device may power down without warning. Alternatively, the device may indicate that the battery needs replacement when there is still sufficient capacity for operation.

SUMMARY

The systems and methods in the present disclosure provide practical applications and technical advantages that overcome the current technical problems described herein. As discussed above, if a user mistakenly uses an alkaline battery in a battery-operated device designed for lithium batteries, the software in the device may provide an improper battery warning or an incident where the device may power down without warning. The provided systems and methods are integrated into the practical application of determining a battery type (e.g., classifying as a lithium battery or an alkaline battery) based on voltage drop characteristics during use of the battery-operated device. By automatically detecting the battery type, the device may more accurately estimate the battery capacity, resulting in improved battery status indications and improving user experience.

In some embodiments, the present disclosure provides systems and methods for determining a battery type for one or more batteries in a device (e.g., a temperature and/or humidity sensor in an HVAC system). The device in the system is configured to receive power from the one or more batteries. The provided systems and methods provide various embodiments for determining a battery type for the one or more batteries in the device. For example, in a first embodiment, the battery type of the one or more batteries in the device may be determined by measuring a terminal voltage of the one or more batteries after an initial pre-determined time period of operation (e.g., at least two days). The provided systems and methods may compare the initial terminal voltage of the one or more batteries to a first initial voltage threshold and a second initial voltage threshold. The provided systems and methods may determine whether (i) the initial terminal voltage of the one or more batteries is lower than the first initial voltage threshold (e.g., $V_i<2.5V$) and (ii) if the initial terminal voltage of the one or more batteries is greater than the second initial voltage threshold (e.g., $V_i>3.4V$). The provided systems and methods may then confirm that the one or more batteries corresponds to a first battery type (e.g., alkaline battery) if the initial terminal voltage is less than the first initial voltage threshold (e.g., $V_i<2.5V$) and confirm that the one or more batteries corresponds to a second battery type (e.g., lithium battery) if the initial terminal voltage is greater than the second initial voltage threshold (e.g., $V_i>3.4V$).

In the second embodiment, the initial terminal voltage of the one or more batteries may be between the first initial voltage threshold and the second initial voltage threshold (e.g., $3.4V>V_i>2.5V$). In some embodiments, the provided systems and methods may determine the battery type in the second embodiment by measuring the voltage drop over time within two or more pre-determined voltage bands that fall between the first initial voltage threshold and the second initial voltage threshold. For example, the pre-determined voltage bands may include, but are not limited to, a first pre-determined voltage band (e.g., $3.4V>V_i>3.1V$), a second pre-determined voltage band (e.g., $3.1V>V_i>2.9V$), a third pre-determined voltage band (e.g., $2.9V>V_i>2.8V$), a fourth pre-determined voltage band (e.g., $2.8V>V_i>2.7V$), a fifth pre-determined voltage band (e.g., $2.7V>V_i>2.6V$), and a sixth pre-determined voltage band (e.g., $2.6V>V_i>2.5V$). The initial terminal voltage of the one or more batteries can appear in any one of the pre-determined voltage bands depending on how much capacity is left in the one or more batteries. In some instances, measuring the voltage drop of the one or more batteries in a single pre-determined voltage band may not be sufficient to accurately determine the battery type. However, by measuring the voltage drop over time within two or more pre-determined voltage bands, the confidence interval improves to accurately determine the battery type.

For example, in the second embodiment, the provided systems and methods may determine the battery type of the one or more batteries by measuring a first terminal voltage of the one or more batteries and comparing the first terminal voltage to at least a first one of the plurality of pre-determined voltage bands. The provided systems and methods may determine that the first terminal voltage corresponds to one of the pre-determined voltage bands based on the comparison (e.g., may correspond to the first pre-determined voltage band). The provided systems and methods may measure a second terminal voltage of the one or more batteries after a pre-determined time period has elapsed for the respective pre-determined voltage band (e.g., a first pre-determined time period for the first pre-determined voltage band). The provided systems and methods may determine a first voltage drop based on a difference between the first terminal voltage and the second terminal voltage, and compare the first voltage drop to a threshold voltage drop for the respective pre-determined voltage band (e.g., a first threshold voltage drop for the first pre-determined voltage band). The provided systems and methods may determine an initial battery type of the one or more batteries based upon the comparison of the voltage drop to the respective threshold voltage drop associated with the pre-determined voltage band. The provided systems and methods may then measure a third terminal voltage of the one or more batteries and compare the third terminal voltage to a second one of the pre-determined voltage bands to determine that the third terminal voltage corresponds to another pre-determined voltage band based on the comparison (e.g., may correspond to a second pre-determined voltage band). The provided systems and methods may then measure a fourth terminal voltage of the one or more batteries after the respective pre-determined time period for the respective pre-determined voltage band (e.g., a second pre-determined time period for the second pre-determined voltage band). The provided systems and methods may determine a second voltage drop based at least in part upon a difference between third terminal voltage and the fourth terminal voltage. The provided systems and methods may compare the second voltage drop for the respective pre-determined voltage band to the respective threshold voltage drop for the respective pre-determined voltage band (e.g., a second threshold voltage drop for the second pre-determined voltage band), and confirm the battery type for the first battery based at least in part upon the initial battery type and the comparison of the second voltage drop to the second threshold voltage drop.

The disclosed systems and methods provide several practical applications and technical advantages. The provided systems and methods provide an improvement to the underlying technology via the device being configured to detect the battery type of the one or more batteries during use of the device. Previous devices assume that the correct battery type is inserted and utilized by the user. In these circumstances, previous devices would incorrectly display the battery life of the device when the user inserts the incorrect battery type for the device, as the device calculates the battery device assuming the correct battery type is utilized. This can lead to the device powering down without warning, as the battery life is incorrectly displayed on the device. By detecting the battery type during use of the device, the provided systems and methods provide the practical application of being able to adjust the battery life displayed by the device based on the battery type utilized by the user, thereby improving the accuracy and precision of the battery life indicator and improved user satisfaction.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, if a user mistakenly uses an alkaline battery in a battery-operated device designed for lithium batteries, the software in the device may provide an improper battery warning or an incident where the device may power down without warning. The provided systems and methods are integrated into the practical application of determining a battery type (e.g., classifying as a lithium battery or an alkaline battery) based on voltage drop characteristics during use of the battery-operated device. By automatically detecting the battery type, the device may more accurately estimate the battery capacity, resulting in improved battery status indications and improving user experience.

Figure 1:
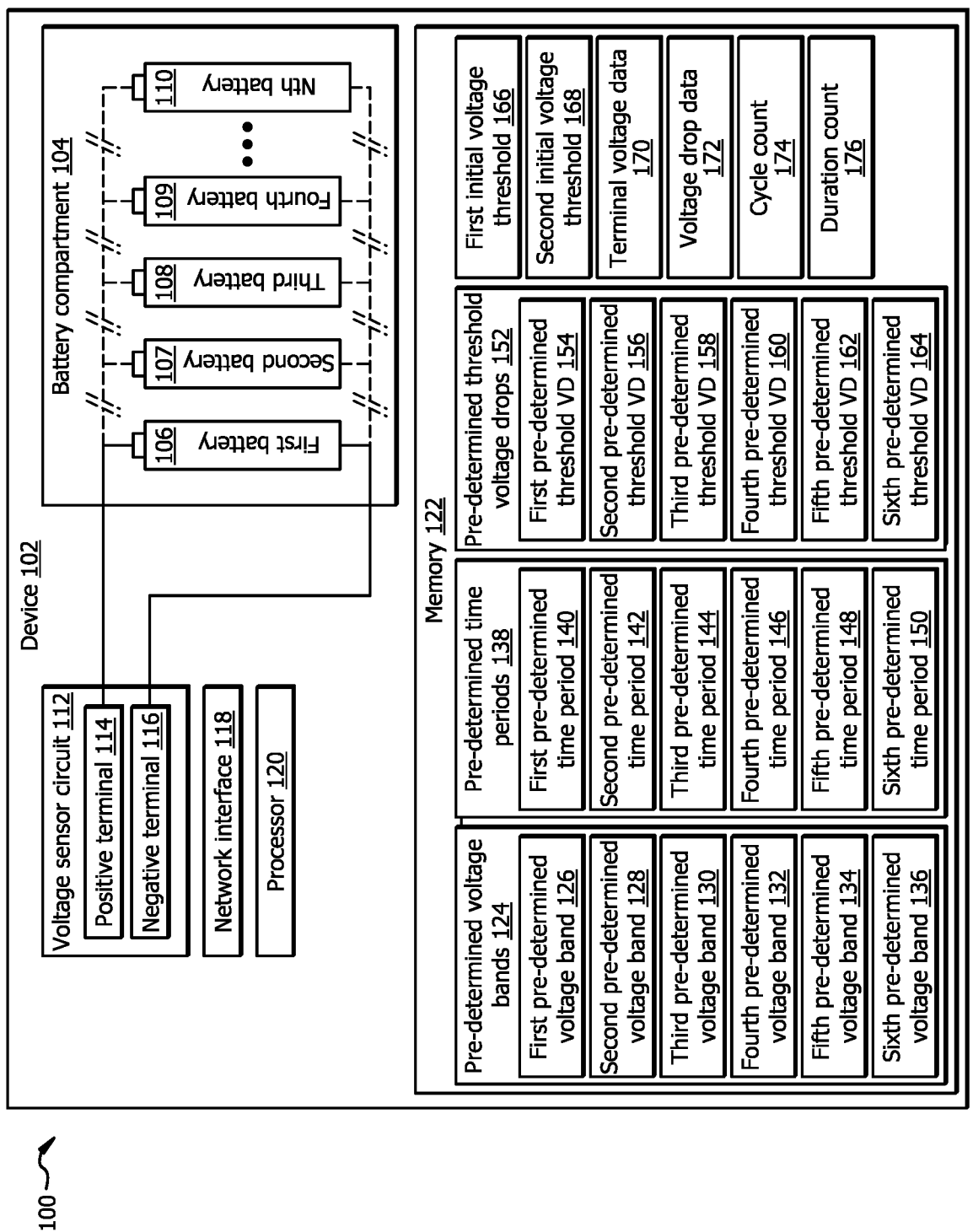
FIG. 1 illustrates a system according to an embodiment of the present disclosure.
Figure 2:
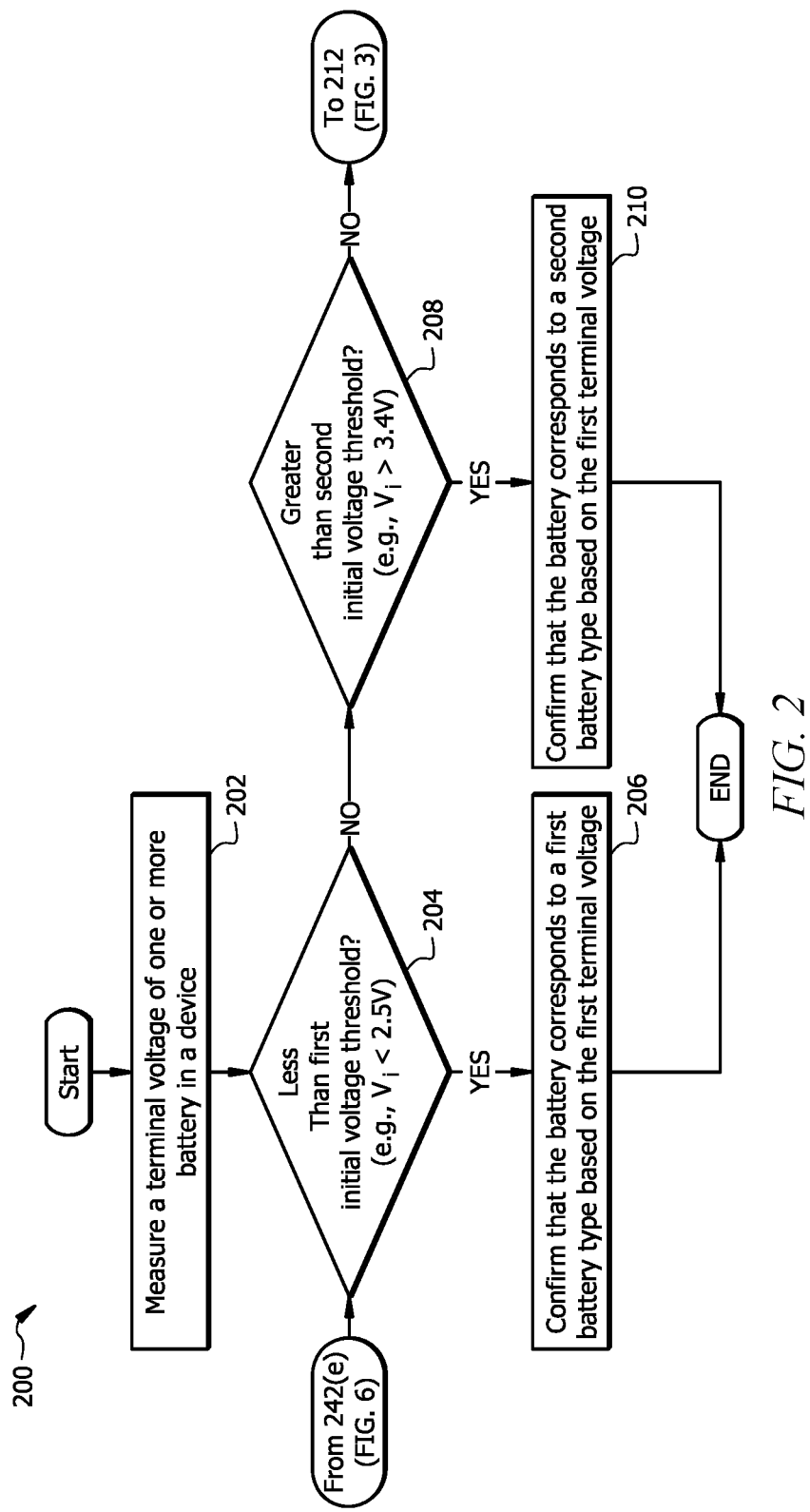
FIG. 2 illustrates a flowchart of one embodiment of a method of operating the system of FIG. 1.

System Overview:

FIG. 1 illustrates a system 100 for determining a battery type for one or more batteries 106-110 in a device 102. The device 102 is configured to receive power from the one or more batteries 106-110, which may be positioned in a battery compartment 104. The system 100 includes a voltage sensor circuit 112 configured to measure a terminal voltage for each of the one or more batteries 106-110. The voltage sensor circuit 112 may include a positive terminal 114 that connects to the positive terminal of the one or more batteries 106-110 and a negative terminal 116 that connects to the negative terminal of the one or more batteries 106-110. The device 102 may include a network interface 118 that is configured to provide communication between the processor 120 and the memory 122.

System Components

Device

The device 102 may be any device that is configured to receive at least a portion of the power to operate from one or more batteries 106-110. In one non-limiting example, the device 102 is a temperature and/or humidity sensor configured to measure a temperature and/or a humidity of a target space in a heating, ventilation, and air conditioning (HVAC) system. The device 102 may include a battery compartment 104 configured to receive the one or more batteries 106-110. The device 102 may be powered by any number of batteries. For example, the one or more batteries 106-110 may include one or more of a first battery 106, a second battery 107, a third battery 108, a fourth battery 109, or an $N^{th}$ battery 110 (i.e., any number of batteries).

The device 102 includes a voltage sensor circuit 112 that is configured to measure a terminal voltage for each of the one or more batteries 106-110. The voltage sensor circuit 112 may include a positive terminal 114 configured to connect to a positive terminal of the first battery 106 and a negative terminal 116 configured to connect to the negative terminal of the first battery 106 to measure the terminal voltage of the first battery 106. As shown by the dotted lines, the positive terminal 114 may be connected to a positive terminal of any one of the other batteries 107-110 and the negative terminal 116 may be connected to a negative terminal of any one of the other batteries 107-110 to determine the terminal voltage.

The network interface 118 is configured to enable wired and/or wireless communications between the voltage sensor circuit 112, the processor 120, and the memory 122. In some embodiments, the network interface 118 includes, but is not limited to, an near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 118 may be configured to use any suitable type of communication protocol as would be appreciated by one of ordinary skill in the art.

The processor 120 is configured to send and receive data using the network interface 118. The processor 120 is operatively coupled to the voltage sensor circuit 112 and the memory 122 for electronic communication. The processor 120 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 120 may be implemented in cloud devices, servers, virtual machines, and the like. The processor 120 may be a programmable logic device, a microcontroller, a microprocessor, or any suitable combination of the preceding. The processor 120 is configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, registers the supply operands to the ALU and store the results of ALU operations, and a control unit that fetches instructions from the memory 122 and executes them by directing the coordinated operations of the ALU, registers and other components. The processor 120 is configured to implement various instructions described herein. For example, the processor 120 is configured to execute instructions from the memory 122 to implement the functions of the processor 120 as described herein. In this way, the processor 120 may be a special-purpose computer designed to implement the functions disclosed herein. In an embodiment, the processor 120 is implemented using logic units, FPGAs, ASICs, DSPs, or any other suitable hardware.

The memory 122 may be a non-transitory computer readable medium. For example, the memory 122 may be volatile or non-volatile and may comprise a read-only memory (ROM), random-access memory (RAM), ternary content-addressable memory (TCAM), dynamic random-access memory (DRAM), and static random-access memory (SRAM). The memory 122 may be implemented using one or more disks, tape drives, solid-state drives, and/or the like.

The memory 122 is operable to store a plurality of pre-determined voltage bands 124 associated with the one or more batteries 106-110. For example, the plurality of pre-determined voltage bands 124 may include a first pre-determined voltage band 126 comprising a first range of voltages (e.g., $3.4V>V_i>3.1V$), a second pre-determined voltage band 128 comprising a second range of voltages (e.g., $3.1V>V_i>2.9V$), a third pre-determined voltage band 130 comprising a third range of voltages (e.g., $2.9V>V_i>2.8V$), a fourth pre-determined voltage band 132 comprising a fourth range of voltages (e.g., $2.8V>V_i>2.7V$), a fifth pre-determined voltage band 134 comprising a fifth range of voltages (e.g., $2.7V>V_i>2.6V$), and a sixth pre-determined voltage band 136 comprising a sixth range of voltages (e.g., $2.6V>V_i>2.5V$).

The memory 122 is operable to store a plurality of pre-determined time periods 138 that are associated with the plurality of pre-determined voltage bands 124. Without wishing to be bound to any particular theory, it has been found that each of the plurality of pre-determined voltage bands 124 for various battery types (e.g., alkaline vs. lithium) exhibit different rates of change for voltage (e.g., a voltage drop) while the device 102 is used over time. In some embodiments, the particular voltage drops for each of the plurality of pre-determined voltage bands 124 may be used at least in part to classify the battery type. Applicant has further found that the time period to observe a statistically significant voltage drop for each of the plurality of pre-determined voltage bands 124 may depend on the respective pre-determined voltage band, and in some cases, may be unique to the respective pre-determined voltage band. In one non-limiting example, the plurality of pre-determined time periods 138 may include a first pre-determined time period 140 (e.g., at least two days) for the first pre-determined voltage band 126, a second pre-determined time period 142 (e.g., at least seven days), a third pre-determined time period 144 (e.g., at least eleven days), a fourth pre-determined time period 146 (e.g., at least thirteen days), a fifth pre-determined time period 148 (e.g., at least twenty days), and a sixth pre-determined time period 150 (e.g., at least twenty days).

The memory 122 is operable to store a plurality of pre-determined threshold voltage drops 152 that are associated with the plurality of pre-determined voltage bands 124. As discussed above, different battery types may exhibit unique rates of change in voltage while operating the device 102 within the plurality of pre-determined voltage bands 124. In one non-limiting example, after at least two days of operation of the device 102, an alkaline battery in the first pre-determined voltage band 126 may exhibit a voltage drop of greater than 100 mV, and a lithium battery in the first pre-determined voltage band 126 may exhibit a voltage drop of less than 100 mV. In a second non-limiting example, after at least seven days of operation of the device 102, an alkaline battery in the second pre-determined voltage band 128 may exhibit a voltage drop of greater than 80 mV, and a lithium battery in the second pre-determined voltage band 128 may exhibit a voltage drop of less than 80V. In this way, the memory 122 may store a pre-determined threshold voltage drop 152 for each of the plurality of pre-determined voltage bands 124 that can be used to classify and/or confirm a battery type being used in the device 102, as will be described in greater detail below.

In some embodiments, the pre-determined threshold voltage drops 152 comprise at least a first pre-determined threshold voltage drop 154 (e.g., $V_d>100$ mV) for the first pre-determined voltage band 126, a second pre-determined threshold voltage drop 156 (e.g., $V_d>80$ mV) for the second pre-determined voltage band 128, a third pre-determined threshold voltage drop 158 (e.g., $V_d>80$ mV) for the third pre-determined voltage band 130, a fourth pre-determined threshold voltage drop 160 (e.g., $V_d>40$ mV) for the fourth pre-determined voltage band 132, a fifth pre-determined threshold voltage drop 162 (e.g., $V_d>40$ mV) for the fifth pre-determined voltage band 134, and a sixth pre-determined threshold voltage drop 164 (e.g., $V_d>40$ mV) for the sixth pre-determined voltage band 136.

The memory 122 is also operable to store a first initial voltage threshold 166 and a second initial voltage threshold 168. As will be detailed below, in certain scenarios where the initial terminal voltage of the one or more batteries 106-110 falls below the first initial voltage threshold 166 (e.g., $V_i<2.5V$), the one or more batteries 106-110 may be classified as corresponding to a first battery type (e.g., alkaline). Similarly, in certain scenarios where the initial terminal voltage of the one or more batteries 106-110 falls above the second initial voltage threshold 168 (e.g., $V_i>3.4V$), the one or more batteries 106-110 may be classified as corresponding to a second battery type (e.g., lithium). The memory 122 is also operable to store terminal voltage data 170 and voltage drop data 172. For example, the terminal voltage data 170 may include an initial terminal voltage for the one or more batteries 106-110 and any subsequent terminal voltage that is measured after the pre-determined time periods 138. In some embodiments, the terminal voltage for the one or more batteries 106-110 is acquired when the device is powered on, but may be acquired during use of the device 102. The voltage drop data 172 includes a difference between the initial terminal voltage and the subsequent terminal voltage that is measured after the pre-determined time periods 138.

The memory 122 is also operable to store a cycle count 174. In some embodiments, the cycle count 174 refers to a number of passes through the plurality of pre-determined voltage bands 124 that are to be performed in order to generate an accurate prediction of the battery type. That is, it has been found that in certain instances, using the measured voltage drop within a single pre-determined voltage band may not always produce an accurate prediction of the battery type. However, by measuring the voltage drop within at least two pre-determined voltage bands and comparing to the respective pre-determined threshold voltage drops of the at least two pre-determined voltage bands, the accuracy of predicting the battery type improves. In some embodiments, the cycle count 174 may be set to at least two, where each cycle in the cycle count 174 refers to a pass through a respective pre-determined voltage band, as will be detailed further below in FIGS. 2-6. The memory 122 may be updated with the current cycle count 174. For example, once a first pass has been made through a first one of the plurality of pre-determined voltage bands 124, the cycle count 174 may be updated by decrementing the cycle count by 1 (e.g., decrease the cycle count from 2 to 1). Once a second pass has been made through a second one of the plurality of pre-determined voltage bands 124, the cycle count 174 may be updated by further decrementing the cycle count by 1 (e.g., decrease the cycle count from 1 to 0). Once the cycle count 174 has reached zero, the provided systems and method may confirm the battery type by comparing the measured voltage drops to the pre-determined threshold voltage drops 152, as will be detailed in greater detail with respect to FIGS. 2-6. It is to be appreciated that any number of cycle counts 174 may be used (e.g., at least 2, at least 3, to less than 4, less than 5, less than 6). If the cycle count 174 is greater than 2, the number of passes through the plurality of pre-determined voltage bands 124 increases. Utilizing additional pre-determined voltage bands may improve the accuracy of predicting the battery type.

In some embodiments, the memory 122 is also operable to store a duration count 176. In some embodiments, the duration count 176 refers to the amount of time spent within any one of the plurality of pre-determined voltage bands 124. In some embodiments, the duration count 176 may be measured in days, or any suitable time metric. As will be detailed in FIGS. 2-6 below, the duration count 176 may be compared to the plurality of pre-determined time periods 138.

System Operation

FIGS. 2-6 illustrate one embodiment of an operational flow 200 for determining a battery type for one or more batteries 106-110 in a device 102. The operational flow 200 can be logically described in two parts. The first part includes the operations described in FIG. 2, which generally include a first scenario where the first terminal voltage measured for the first battery 106 is less than the first initial voltage threshold 166 or is greater than the second initial voltage threshold 168. For example, the first part may generally include the operations of measuring a first terminal voltage of at least the first battery 106 in a device 102, determining whether the first terminal voltage of the first battery 106 is less than a first initial voltage threshold 166 and determining whether the first terminal voltage of the first battery 106 is greater than a second initial voltage threshold 168. If the first terminal voltage is less than the first initial voltage threshold 166 (e.g., $V_i<2.5V$), then the first part of operational flow 200 may confirm that the first battery 106 corresponds to a first battery type (e.g., alkaline battery). If the first terminal voltage is greater than the second initial voltage threshold 168, then the first part of operational flow 200 may confirm that the first battery 106 corresponds to a second battery type (e.g., lithium battery).

The second part includes the operations described in FIGS. 3-6, which generally include a second scenario where the first terminal voltage measured for at least the first battery 106 falls between the first initial voltage threshold 166 and the second initial voltage threshold 168, and within at least a first one of the plurality of pre-determined voltage bands 124. In general, the second part includes measuring a first terminal voltage of at least the first battery 106, comparing the first terminal voltage to at least a first one of the plurality of pre-determined voltage bands 124, and determining that the first terminal voltage corresponds to one of the plurality of pre-determine voltage bands 124 (e.g., first cycle in the cycle count 174). The second part further includes measuring a second terminal voltage of the first battery 106 after the pre-determined time period 138 has elapsed for the respective pre-determined voltage band 124, determining a first voltage drop based on a difference between the first terminal voltage and the second terminal voltage, and comparing the first voltage drop to a threshold voltage drop 152 for the respective pre-determined voltage band 124. The second part further includes determining an initial battery type of the one or more batteries based upon the comparison of the voltage drop to the respective threshold voltage drop 152 associated with the pre-determined voltage band 124.

The second part further includes measuring a third terminal voltage of the first battery 106, comparing the third terminal voltage to a second one of the pre-determined voltage bands 124 (e.g., second cycle in cycle count 174). The second part further includes determining that the third terminal voltage corresponds to the second one of the plurality of pre-determined voltage band 124 based on the comparison, measuring a fourth terminal voltage of the first battery 106 after the pre-determined time period 138 elapses for the second one of the plurality of pre-determined voltage bands 124, and determining a second voltage drop based at least in part upon a difference between third terminal voltage and the fourth terminal voltage. The second part further includes comparing the second voltage drop to the threshold voltage drop 152 for the second one of the plurality of pre-determined voltage bands 124, and confirming the battery type for the first battery based at least in part upon the initial battery type and the comparison of the second voltage drop to the second threshold voltage drop.

In operation, the operational flow 200 may begin at operation 202 where the voltage sensor circuit 112 measures a first terminal voltage of at least a first battery 106. At decision block 204, the operational flow 200 includes determining whether the first terminal voltage of the first battery 106 is less than a first initial voltage threshold 166. For example, the first initial voltage threshold 166 may be 2.5V. If the first terminal voltage of the first battery 106 is less than the first initial voltage threshold 166, the operational flow 200 proceeds to operation 206 to confirm that the first battery corresponds to a first battery type based on the first terminal voltage. In some embodiments, the first battery type is an alkaline battery. If the first terminal voltage of the first battery 106 is higher than the first initial voltage threshold 166, the operational flow proceeds to decision block 208.

In decision block 208, the operational flow 200 includes determining whether the first terminal voltage of the first battery 106 is greater than the second initial voltage threshold 168. For example, the second initial voltage threshold 168 may be 3.4V. If the first terminal voltage of the first battery 106 is greater than the second initial voltage threshold 168, the operational flow 200 proceeds to operation 210 to confirm that the first battery 106 corresponds to a second battery type. In some embodiments, the second battery type is a lithium battery. If the terminal voltage of the first battery 106 is less than the second initial voltage threshold, the operational flow 200 proceeds to operation 212.

Figure 3:
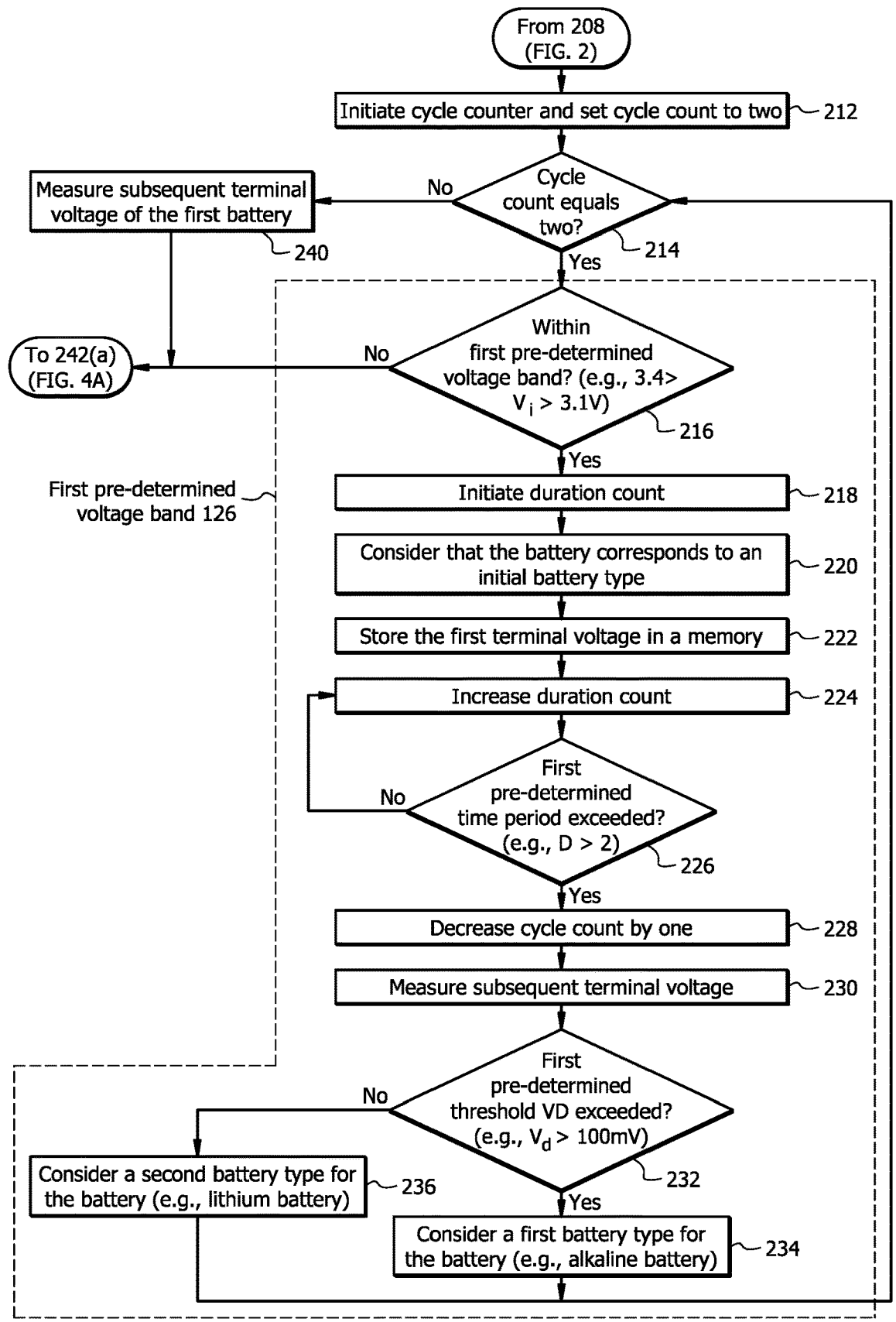
FIG. 3 illustrates a continuation of the flowchart from FIG. 2.

Referring to FIG. 3, in operation 212, the operational flow 200 includes initiating the cycle count 174. In some embodiments, the cycle count 174 is set to two. At decision block 214, the operational flow 200 includes determining if the cycle count 174 is equal to two. If the cycle count 174 is equal to two, the operational flow 200 proceeds to decision block 216. If the cycle count is not equal to two, the operational flow proceeds to operation 240, which will be detailed below.

At decision block 216, the operational flow 200 includes determining whether the first terminal voltage of the first battery 106 corresponds to the first pre-determined voltage band 126. For example, the first pre-determined voltage band 126 may comprise a first range of voltages. In one non-limiting example, the first range of voltages may comprise voltages between 3.1V to 3.4V. If the first terminal voltage of the first battery 106 does not fall within the first range of voltages, then the operational flow 200 proceeds to operation 242(a), which will be detailed below. If the first terminal voltage of the first battery 106 does fall within the first range of voltages, the operational flow 200 may proceed to operation 218.

At operation 218, the operational flow 200 includes initiating the duration count 176. For example, initiating the duration count 176 may include starting a timer. At operation 220, the operational flow 200 includes making an initial assumption for the battery type of the first battery 106. For example, operation 220 may include considering that the first battery 106 corresponds to an initial battery type (e.g., consider the first battery 106 as being an alkaline battery). The operational flow 200 may proceed to operation 222, where the first terminal voltage is stored in the memory 122 within the terminal voltage data 170. The operational flow 200 proceeds to operation 224, which includes increasing the duration count 176.

At decision block 226, the operational flow 200 includes determining if the first pre-determined time period 140 is exceeded. For example, decision block 226 may include comparing the duration count 176 to the first pre-determined time period 140 for the first pre-determined voltage band 126. In some embodiments, the first pre-determined time period 140 for the first pre-determined voltage band 126 is set to at least two days. If the duration count 176 exceeds the first pre-determined time period 140, the operational flow 200 proceeds to operation 228. If the duration count 176 is less than the first pre-determined time period 140, decision block 226 returns the operational flow 200 to operation 224 to increase the duration count 176. At operation 228, the operational flow 200 includes decreasing the cycle count 174 by 1. For example, as discussed above, the accuracy of predicting the battery type increases when at least two of the plurality of pre-determined voltage bands 124 are utilized to classify the battery type. At operation 230, the operational flow 200 includes measuring a subsequent terminal voltage for the first battery 106 (e.g., a second terminal voltage).

At decision block 232, the operational flow 200 includes determining whether a first voltage drop based at least in part upon a difference between the first terminal voltage from operation 202 and the second terminal voltage from operation 230 is greater than the first pre-determined threshold voltage drop 154. In some embodiments, the first pre-determined threshold voltage drop 154 is 100 mV. If the first voltage drop is greater than the first pre-determined threshold voltage drop 154 (e.g., $V_d$>100 mV), then the operational flow 200 proceeds to operation 234. At operation 234, the operational flow 200 includes considering that the first battery 106 corresponds to the first battery type (e.g., an alkaline battery). If the first voltage drop is less than the first pre-determined threshold voltage drop 154 (e.g., $V_d$<100 mV), then the operational flow 200 proceeds to operation 236. At operation 236, the operational flow 200 includes considering that the first battery 106 corresponds to a second battery type (e.g., lithium battery).

After operational flow 200 proceeds through either operation 234 or 236, the operational flow 200 returns to decision block 214. At decision block 214, the operational flow 200 determines whether the cycle count is equal to two. If the operational flow 200 proceeds through the first pre-determined voltage band 126, the cycle count 174 will be less than two due to operation 228. At decision block 214, if the cycle count 174 is less than two, the operational flow 200 proceeds to operation 240. Operation 240 includes measuring a subsequent terminal voltage of the first battery 106. If the operational flow 200 proceeds through the first pre-determined voltage band 126, the subsequent terminal voltage measured in operation 240 of the first battery 106 is the third terminal voltage measured. However, as discussed above, if it is determined in decision block 216 that the first terminal voltage of the first battery 106 does not fall within the first pre-determined voltage band 126, then the operational flow 200 may proceed to decision block 242(a) without measuring the subsequent terminal voltage in operation 240.

Figure 4A:
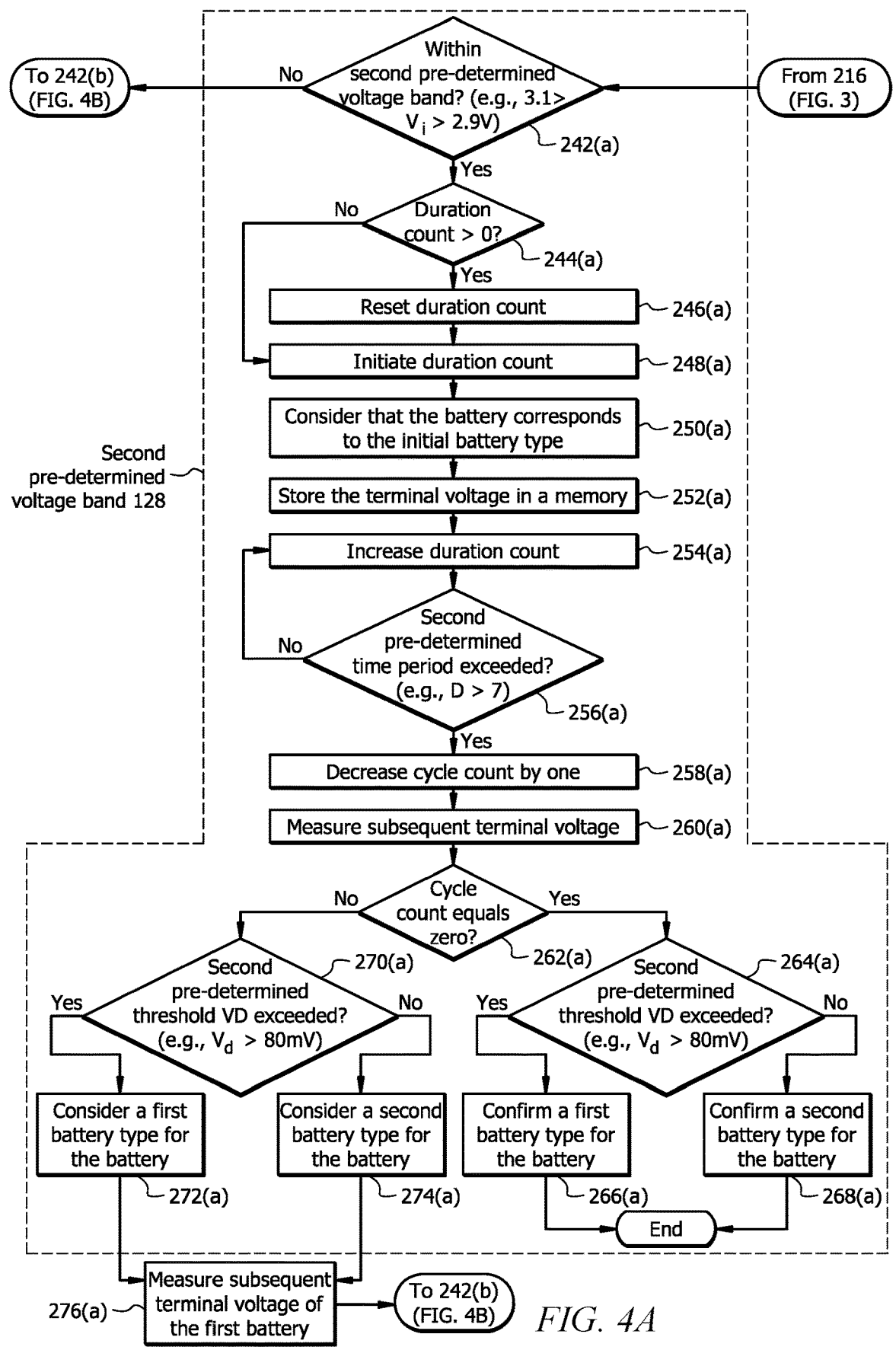
FIG. 4A illustrates a continuation of the flowchart from FIG. 3.

Referring to FIG. 4A, at decision block 242(a), the operational flow 200 includes determining whether the first terminal voltage or the subsequent terminal voltage (e.g., measured in operation 240) of the first battery 106 corresponds to the second pre-determined voltage band 128. For example, the second pre-determined voltage band 128 may comprise a second range of voltages. In one non-liming example, the second range of voltages may comprise voltages between 2.9V to 3.1V. If the first terminal voltage or the subsequent terminal voltage (measured in operation 240) of the first battery 106 does not fall within the second range of voltages, then the operational flow 200 proceeds to operation 242(b), which will be detailed below. If the first terminal voltage or the subsequent terminal voltage (measured in operation 240) of the first battery 106 does fall within the second range of voltages, the operational flow 200 may proceed to decision block 244(a).

In decision block 244(a), the operational flow 200 includes determining if the duration count 176 is greater than zero. If the duration count 176 is greater than zero, the operational flow 200 proceeds to operation 246(a) to reset the duration count 176 to zero. If the duration count 176 is equal to zero, the operational flow skips operation 246(a) and proceeds to operation 248(a). At operation 248(a), the operational flow 200 initiates the duration count 176 for the second pre-determined voltage band 128 and proceeds to operation 250(*a*). At operation 250(*a*), the operational flow 200 which includes making an assumption for the battery type of the first battery 106. For example, operation 250(*a*) may include considering that the first battery 106 corresponds to an initial battery type (e.g., consider the first battery 106 as being an alkaline battery). The operational flow 200 may proceed to operation 252(*a*), where any previously acquired terminal voltage, such as the first terminal voltage or the subsequent terminal voltage (measured in operation 240) is stored in the memory 122 within the terminal voltage data 170. The operational flow 200 proceeds to operation 254(*a*), which includes increasing the duration count 176.

At decision block 256(*a*), the operational flow 200 includes determining if the second pre-determined time period 142 is exceeded. For example, decision block 256(*a*) may include comparing the duration count 176 to the second pre-determined time period 142 for the second pre-determined voltage band 128. In some embodiments, the second pre-determined time period 142 for the second pre-determined voltage band 128 is set to at least seven days. If the duration count 176 exceeds the second pre-determined time period 142, the operational flow 200 proceeds to operation 258(*a*). If the duration count 176 is less than the second pre-determined time period 142, decision block 226 returns the operational flow 200 to operation 254(*a*) to increase the duration count 176. At operation 258(*a*), the operational flow 200 includes decreasing the cycle count 174 by 1. At operation 260(*a*), the operational flow 200 includes measuring a subsequent terminal voltage for the first battery 106. The subsequent terminal voltage measured in operation 260(*a*) may correspond to a second terminal voltage if the first pre-determined voltage band 126 is by-passed, or a fourth terminal voltage if operation 240 is performed.

At decision block 262(*a*), the operational flow 200 includes determining whether the cycle count 174 is equal to zero. If the cycle count 174 is equal to zero, the operational flow 200 proceeds to decision block 264(*a*). Decision block 264(*a*) includes determining whether a second voltage drop that is based at least in part upon a difference between the terminal voltage from operation 240 and the terminal voltage from operation 260(*a*) is greater than the second pre-determined threshold voltage drop 156. In some embodiments, the second pre-determined threshold voltage drop 156 is 80 mV. If the second voltage drop is greater than the second pre-determined threshold voltage drop 156 (e.g., $V_d$>80 mV), then the operational flow 200 proceeds to operation 266(*a*). At operation 266(*a*), the operational flow 200 includes confirming that the first battery 106 corresponds to the first battery type (e.g., an alkaline battery). If the second voltage drop is less than the second pre-determined threshold voltage drop 156 (e.g., $V_d$<80 mV), then the operational flow 200 proceeds to operation 268(*a*). At operation 268(*a*), the operational flow 200 includes confirming that the first battery 106 corresponds to a second battery type (e.g., lithium battery).

Returning to decision block 262(*a*), if the cycle count 174 is not equal to zero (i.e., operation 240 is not performed), the operational flow 200 proceeds to decision block 270(*a*). Decision block 270(*a*) includes determining a first voltage drop based at least in part upon a difference between the first terminal voltage from operation 202 and the second voltage drop from operation 260(*a*) is greater than the second pre-determined threshold voltage drop 156. If the first voltage drop is greater than the second pre-determined threshold voltage drop 156 (e.g., $V_d$>80 mV), then the operational flow 200 proceeds to operation 272(*a*). At operation 272(*a*), the operational flow 200 includes considering that the first battery 106 corresponds to the first battery type (e.g., an alkaline battery). In some instances, the operational flow 200 is not able to confirm the battery type until the cycle count 174 reaches zero. If the first voltage drop is less than the second pre-determined threshold voltage drop 156 (e.g., $V_d$<80 mV), then the operational flow 200 proceeds to operation 274(*a*). At operation 274(*a*), the operational flow 200 includes considering that the first battery 106 corresponds to a second battery type (e.g., lithium battery).

After operational flow 200 proceeds through either operation 272(*a*) or 274(*a*), the operational flow 200 proceeds to operation 276(*a*). Operation 276(*a*) includes measuring a subsequent terminal voltage of the first battery 106. If the operational flow 200 proceeds through the second pre-determined voltage band 128, the subsequent terminal voltage measured in operation 276(*a*) of the first battery 106 is the third terminal voltage measured. However, as discussed above, if it is determined in decision block 242(*a*) that the first terminal voltage of the first battery 106 does not fall within the second pre-determined voltage band 128, then the operational flow 200 may proceed to decision block 242(*b*) without measuring the subsequent terminal voltage in operation 276(*a*).

Figure 4B:
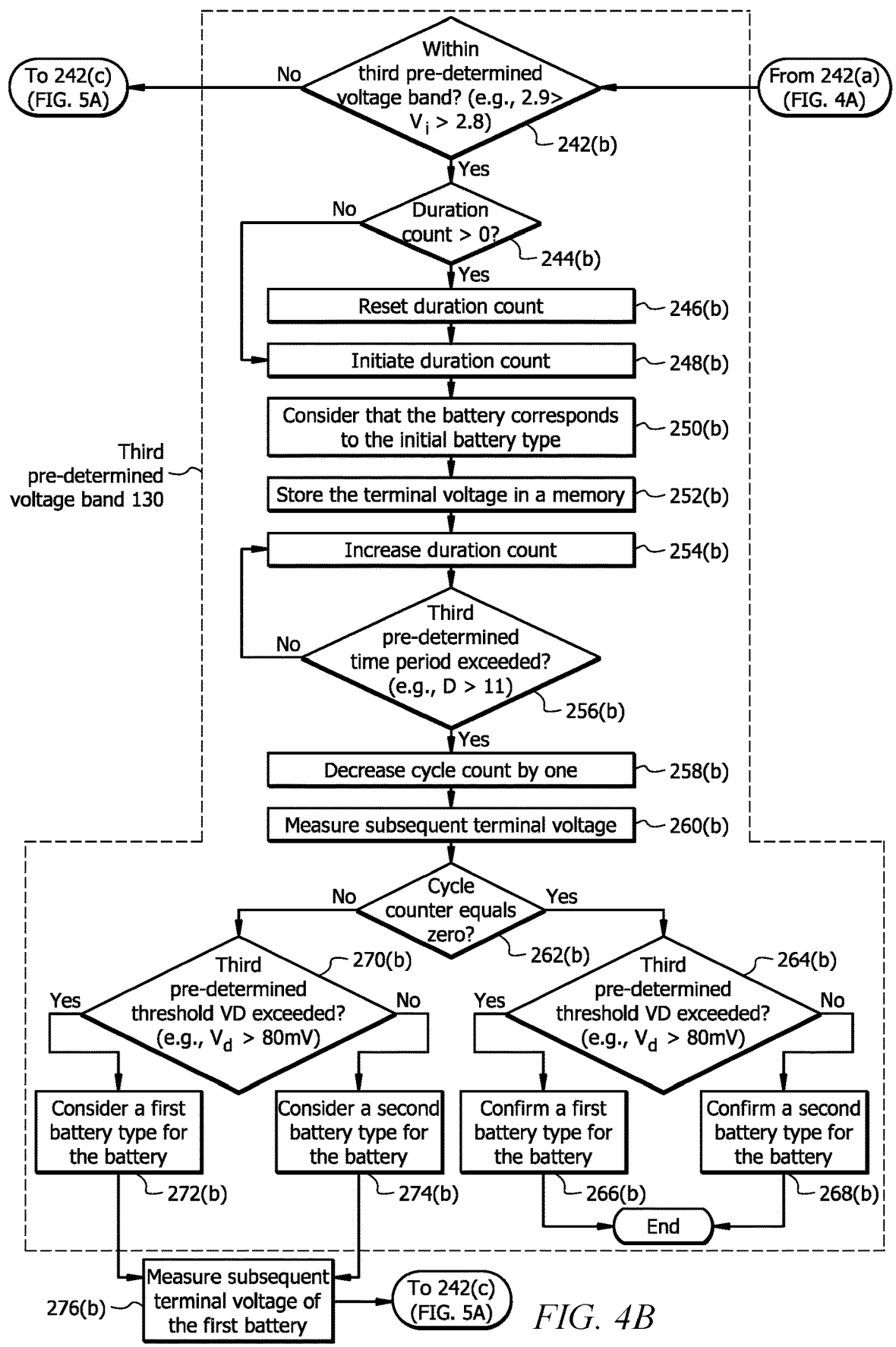
FIG. 4B illustrates a continuation of the flowchart from FIG. 4A.

Referring to FIG. 4B, at decision block 242(*b*), the operational flow 200 includes determining whether the first terminal voltage or the subsequent terminal voltage (e.g., measured in operations 240 or 276(*a*)) of the first battery 106 corresponds to the third pre-determined voltage band 130. For example, the third pre-determined voltage band 130 may comprise a third range of voltages. In one non-liming example, the third range of voltages may comprise voltages between 2.8V to 2.9V. If the first terminal voltage or the subsequent terminal voltage (measured in operations 240 or 276(*a*)) of the first battery 106 does not fall within the third range of voltages, then the operational flow 200 proceeds to operation 242(*c*), which will be detailed below with respect to FIG. 5. If the first terminal voltage or the subsequent terminal voltage (measured in operations 240 or 276(*a*)) of the first battery 106 does fall within the third range of voltages, the operational flow 200 may proceed to decision block 244(*b*).

In decision block 244(*b*), the operational flow 200 includes determining if the duration count 176 is greater than zero. If the duration count 176 is greater than zero, the operational flow 200 proceeds to operation 246(*b*) to reset the duration count 176 to zero. If the duration count 176 is equal to zero, the operational flow skips operation 246(*b*) and proceeds to operation 248(*b*). At operation 248(*b*), the operational flow 200 initiates the duration count 176 for the third pre-determined voltage band 130 and proceeds to operation 250(*b*). At operation 250(*b*), the operational flow 200 which includes making an assumption for the battery type of the first battery 106. For example, operation 250(*b*) may include considering that the first battery 106 corresponds to an initial battery type (e.g., consider the first battery 106 as being an alkaline battery). The operational flow 200 may proceed to operation 252(*b*), where the first terminal voltage or the subsequent terminal voltage (measured in operations 240 or 276(*a*)) is stored in the memory 122 within the terminal voltage data 170. The operational flow 200 proceeds to operation 254(*b*), which includes increasing the duration count 176.

At decision block 256(*b*), the operational flow 200 includes determining if the third pre-determined time period 144 is exceeded. For example, decision block 256(*b*) may include comparing the duration count 176 to the third pre-determined time period 144 for the third pre-determined voltage band 130. In some embodiments, the third pre-determined time period 144 for the third pre-determined voltage band 130 is set to at least eleven days. If the duration count 176 exceeds the third pre-determined time period 144, the operational flow 200 proceeds to operation 258(*b*). If the duration count 176 is less than the third pre-determined time period 144, decision block 256(*b*) returns the operational flow 200 to operation 254(*b*) to increase the duration count 176. At operation 258(*b*), the operational flow 200 includes decreasing the cycle count 174 by 1. At operation 260(*b*), the operational flow 200 includes measuring a subsequent terminal voltage for the first battery 106. The subsequent terminal voltage measured in operation 260(*b*) may correspond to a second terminal voltage if the first pre-determined voltage band 126 and the second pre-determined voltage band 128 are by-passed, or a fourth terminal voltage if operation 240 or 276(*a*) is performed.

At decision block 262(*b*), the operational flow 200 includes determining whether the cycle count 174 is equal to zero. If the cycle count 174 is equal to zero, the operational flow 200 proceeds to decision block 264(*b*). Decision block 264(*b*) includes determining whether a second voltage drop based at least in part upon a difference between the third terminal voltage (e.g., measured from operations 240 or 276(*a*)) and the terminal voltage from operation 260(*b*) is greater than the third pre-determined threshold voltage drop 158. In some embodiments, the third pre-determined threshold voltage drop 158 is 80 mV. If the second voltage drop is greater than the third pre-determined threshold voltage drop 158 (e.g., $V_d$>80 mV), then the operational flow 200 proceeds to operation 266(*b*). At operation 266(*b*), the operational flow 200 includes confirming that the first battery 106 corresponds to the first battery type (e.g., an alkaline battery). The operational flow 200 is able to confirm the battery type because the cycle count 174 reached zero. If the second voltage drop is less than the third pre-determined threshold voltage drop 158 (e.g., $V_d$<80 mV), then the operational flow 200 proceeds to operation 268(*b*). At operation 268(*b*), the operational flow 200 includes confirming that the first battery 106 corresponds to a second battery type (e.g., lithium battery).

Returning to decision block 262(*b*), if the cycle count 174 is not equal to zero (i.e., operation 276(*a*) is not performed), the operational flow 200 proceeds to decision block 270(*b*). Decision block 270(*b*) includes determining whether a first voltage drop based at least in part upon a difference between the first terminal voltage from operation 202 and the second terminal voltage from operation 260(*b*) is greater than the third pre-determined threshold voltage drop 158. If the first voltage drop is greater than the third pre-determined threshold voltage drop 158 (e.g., $V_d$>80 mV), then the operational flow 200 proceeds to operation 272(*b*). At operation 272(*b*), the operational flow 200 includes considering that the first battery 106 corresponds to the first battery type (e.g., an alkaline battery). If the first voltage drop is less than the third pre-determined threshold voltage drop 158 (e.g., $V_d$<80 mV), then the operational flow 200 proceeds to operation 274(*b*). At operation 274(*a*), the operational flow 200 includes considering that the first battery 106 corresponds to a second battery type (e.g., lithium battery).

After operational flow 200 proceeds through either operation 272(*b*) or 274(*b*), the operational flow 200 then proceeds to operation 276(*b*). Operation 276(*b*) includes measuring a subsequent terminal voltage of the first battery 106. If the operational flow 200 proceeds through the third pre-determined voltage band 130, the subsequent terminal voltage measured in operation 276(*b*) of the first battery 106 is the third terminal voltage measured. However, as discussed above, if it is determined in decision block 242(*b*) that the first terminal voltage of the first battery 106 does not fall within the third pre-determined voltage band 130, then the operational flow 200 may proceed to decision block 242(*c*) without measuring the subsequent terminal voltage in operation 276(*b*).

Figure 5A:
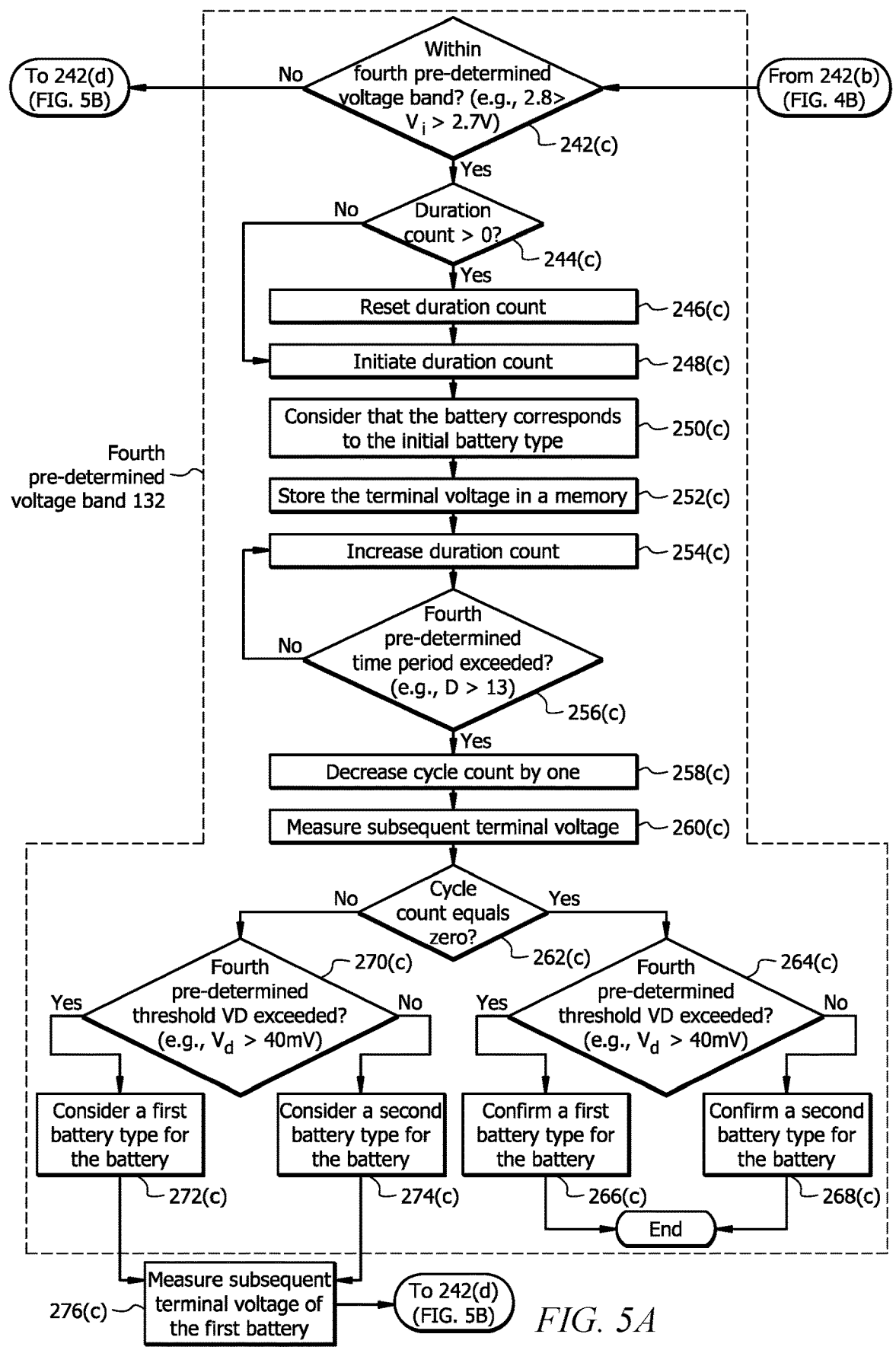
FIG. 5A illustrates a continuation of the flowchart from FIG. 4B.

Referring to FIG. 5A, at decision block 242(*c*), the operational flow 200 includes determining whether the first terminal voltage or the third terminal voltage (e.g., measured in operations 240, 276(*a*), or 276(*b*)) of the first battery 106 corresponds to the fourth pre-determined voltage band 132. For example, the fourth pre-determined voltage band 132 may comprise a fourth range of voltages. In one non-liming example, the fourth range of voltages may comprise voltages between 2.7V to 2.8V. If the first terminal voltage or the third terminal voltage (measured in operations 240, 276(*a*), or 276(*b*)) of the first battery 106 does not fall within the fourth range of voltages, then the operational flow 200 proceeds to operation 242(*d*), which will be detailed below. If the first terminal voltage or the third terminal voltage (measured in operations 240, 276(*a*), or 276(*b*)) of the first battery 106 does fall within the fourth range of voltages, the operational flow 200 may proceed to decision block 244(*c*).

In decision block 244(*c*), the operational flow 200 includes determining if the duration count 176 is greater than zero. If the duration count 176 is greater than zero, the operational flow 200 proceeds to operation 246(*c*) to reset the duration count 176 to zero. If the duration count 176 is equal to zero, the operational flow skips operation 246(*c*) and proceeds to operation 248(*c*). At operation 248(*c*), the operational flow 200 initiates the duration count 176 for the fourth pre-determined voltage band 132 and proceeds to operation 250(*c*). At operation 250(*c*), the operational flow 200 includes making an assumption for the battery type of the first battery 106. For example, operation 250(*c*) may include considering that the first battery 106 corresponds to an initial battery type (e.g., consider the first battery 106 as being an alkaline battery). The operational flow 200 may proceed to operation 252(*c*), where the first terminal voltage or the subsequent terminal voltage (measured in operation 276(*b*)) is stored in the memory 122 within the terminal voltage data 170. The operational flow 200 proceeds to operation 254(*c*), which includes increasing the duration count 176.

At decision block 256(*c*), the operational flow 200 includes determining if the fourth pre-determined time period 146 is exceeded. For example, decision block 256(*c*) may include comparing the duration count 176 to the fourth pre-determined time period 146 for the fourth pre-determined voltage band 132. In some embodiments, the fourth pre-determined time period 146 for the fourth pre-determined voltage band 132 is set to at least thirteen days. If the duration count 176 exceeds the fourth pre-determined time period 146, the operational flow 200 proceeds to operation 258(*c*). If the duration count 176 is less than the fourth pre-determined time period 146, decision block 256(*c*) returns the operational flow 200 to operation 254(*c*) to increase the duration count 176. At operation 258(*c*), the operational flow 200 includes decreasing the cycle count 174 by 1. At operation 260(*c*), the operational flow 200 includes measuring a subsequent terminal voltage for the first battery 106. The subsequent terminal voltage measured in operation 260(*c*) may correspond to a second terminal voltage if the first pre-determined voltage band 126, the second pre-determined voltage band 128, and the third pre-determined voltage band 130 are by-passed, or a fourth terminal voltage if operations 240, 276(*a*), or 276(*b*) are performed.

At decision block 262(*c*), the operational flow 200 includes determining whether the cycle count 174 is equal to zero. If the cycle count 174 is equal to zero, the operational flow 200 proceeds to decision block 264(*c*). Decision block 264(*c*) includes determining whether a second voltage drop that is based at least in part upon a difference between the third terminal voltage (e.g., from operations 240, 276(*a*), or 276(*b*)) and the terminal voltage from operation 260(*c*) is greater than the fourth pre-determined threshold voltage drop 160. In some embodiments, the fourth pre-determined threshold voltage drop 160 is 40 mV. If the second voltage drop is greater than the fourth pre-determined threshold voltage drop 160 (e.g., $V_d$>40 mV), then the operational flow 200 proceeds to operation 266(*c*). At operation 266(*c*), the operational flow 200 includes confirming that the first battery 106 corresponds to the first battery type (e.g., an alkaline battery). If the second voltage drop is less than the fourth pre-determined threshold voltage drop 160 (e.g., $V_d$<40 mV), then the operational flow 200 proceeds to operation 268(*c*). At operation 268(*c*), the operational flow 200 includes confirming that the first battery 106 corresponds to a second battery type (e.g., lithium battery).

Returning to decision block 262(*c*), if the cycle count 174 is not equal to zero, the operational flow 200 proceeds to decision block 270(*c*). Decision block 270(*c*) includes determining whether a first voltage drop that is based at least in part upon a difference between the first terminal voltage from operation 202 and the second voltage drop from operation 260(*c*) is greater than the fourth pre-determined threshold voltage drop 160. If the first voltage drop is greater than the fourth pre-determined threshold voltage drop 160 (e.g., $V_d$>40 mV), then the operational flow 200 proceeds to operation 272(*c*). At operation 272(*c*), the operational flow 200 includes considering that the first battery 106 corresponds to the first battery type (e.g., an alkaline battery). In some instances, the operational flow 200 is not able to confirm the battery type until the cycle count 174 reaches zero. If the first voltage drop is less than the fourth pre-determined threshold voltage drop 160 (e.g., $V_d$<40 mV), then the operational flow 200 proceeds to operation 274(*c*). At operation 274(*c*), the operational flow 200 includes considering that the first battery 106 corresponds to a second battery type (e.g., lithium battery).

After operational flow 200 proceeds through either operation 272(*c*) or 274(*c*), the operational flow 200 then proceeds to operation 276(*c*). Operation 276(*c*) includes measuring a subsequent terminal voltage of the first battery 106. If the operational flow 200 proceeds through the fourth pre-determined voltage band 132, the subsequent terminal voltage measured in operation 276(*c*) of the first battery 106 is the third terminal voltage measured. However, as discussed above, if it is determined in decision block 242(*c*) that the first terminal voltage of the first battery 106 does not fall within the fourth pre-determined voltage band 132, then the operational flow 200 may proceed to decision block 242(*d*) without measuring the subsequent terminal voltage in operation 276(*c*).

Figure 5B:
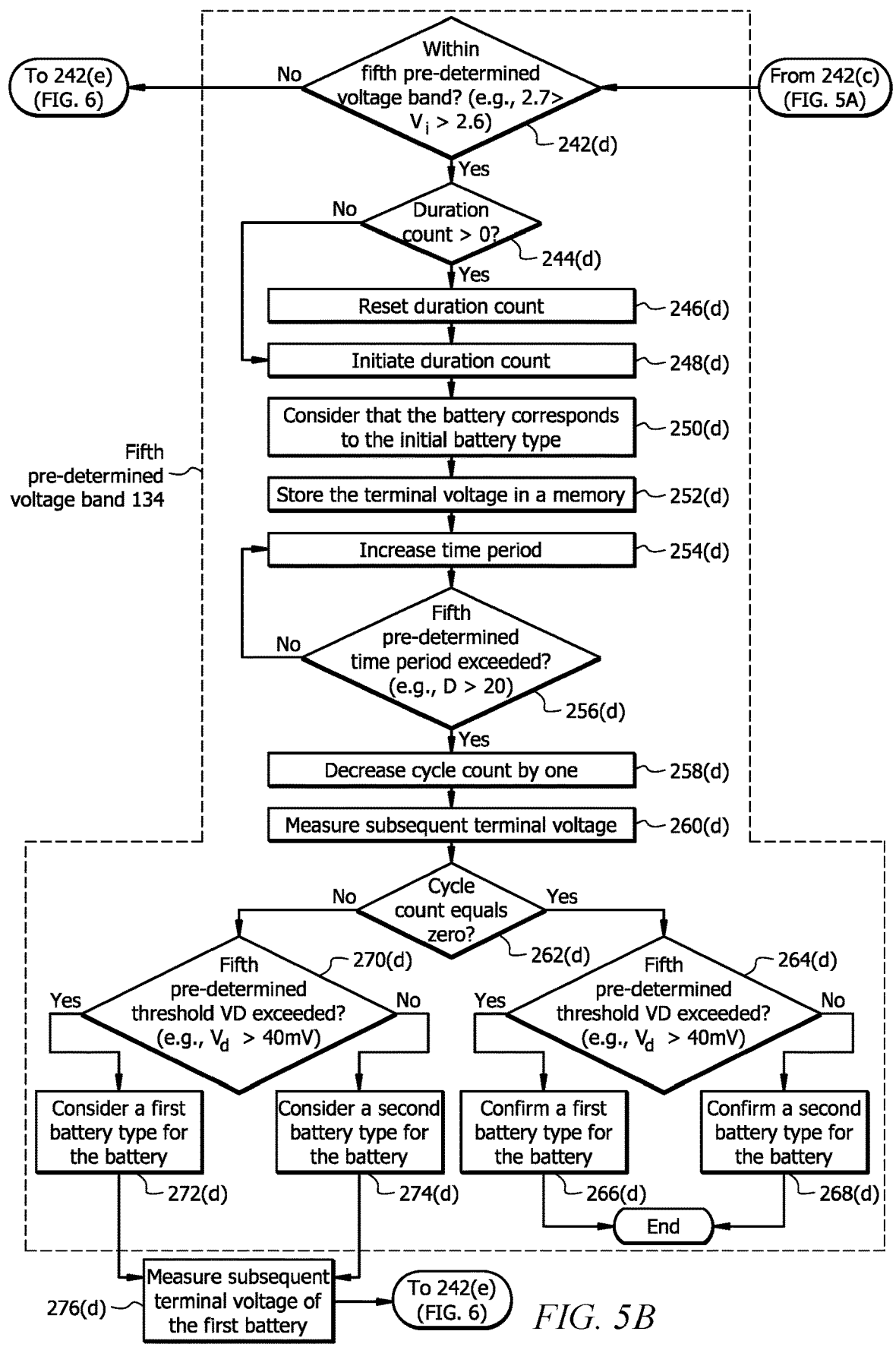
FIG. 5B illustrates a continuation of the flowchart from FIG. 5A.

Referring to FIG. 5B, at decision block 242(*d*), the operational flow 200 includes determining whether the first terminal voltage or the third terminal voltage (e.g., measured in operations 240, 276(*a*), 276(*b*), or 276(*c*)) of the first battery 106 corresponds to the fifth pre-determined voltage band 134. For example, the fifth pre-determined voltage band 134 may comprise a fifth range of voltages. In one non-liming example, the fifth range of voltages may comprise voltages between 2.6 to 2.7V. If the first terminal voltage or the third terminal voltage (measured in operations 240, 276(*a*), 276(*b*), or 276(*c*)) of the first battery 106 does not fall within the fifth range of voltages, then the operational flow 200 proceeds to operation 242(*e*), which will be detailed below with respect to FIG. 6. If the first terminal voltage or the third terminal voltage (measured in operations 240, 276(*a*), 276(*b*), or 276(*c*)) of the first battery 106 does fall within the fifth range of voltages, the operational flow 200 may proceed to decision block 244(*d*).

In decision block 244(*d*), the operational flow 200 includes determining if the duration count 176 is greater than zero. If the duration count 176 is greater than zero, the operational flow 200 proceeds to operation 246(*d*) to reset the duration count 176 to zero. If the duration count 176 is equal to zero, the operational flow skips operation 246(*d*) and proceeds to operation 248(*d*). At operation 248(*d*), the operational flow 200 initiates the duration count 176 for the fifth pre-determined voltage band 134 and proceeds to operation 250(*d*). At operation 250(*d*), the operational flow 200 includes making an assumption for the battery type of the first battery 106. For example, operation 250(*d*) may include considering that the first battery 106 corresponds to an initial battery type (e.g., consider the first battery 106 as being an alkaline battery). The operational flow 200 may proceed to operation 252(*d*), where the first terminal voltage or the subsequent terminal voltage (measured in operation 276(*c*)) is stored in the memory 122 within the terminal voltage data 170. The operational flow 200 proceeds to operation 254(*d*), which includes increasing the duration count 176.

At decision block 256(*d*), the operational flow 200 includes determining if the fifth pre-determined time period 148 is exceeded. For example, decision block 256(*d*) may include comparing the duration count 176 to the fifth pre-determined time period 148 for the fifth pre-determined voltage band 134. In some embodiments, the fifth pre-determined time period 148 for the fifth pre-determined voltage band 134 is set to at least twenty days. If the duration count 176 exceeds the fifth pre-determined time period 148, the operational flow 200 proceeds to operation 258(*d*). If the duration count 176 is less than the fifth pre-determined time period 148, decision block 256(*d*) returns the operational flow 200 to operation 254(*d*) to increase the duration count 176. At operation 258(*d*), the operational flow 200 includes decreasing the cycle count 174 by 1. At operation 260(*d*), the operational flow 200 includes measuring a subsequent terminal voltage for the first battery 106. The subsequent terminal voltage measured in operation 260(*d*) may correspond to a second terminal voltage if the first pre-determined voltage band 126, the second pre-determined voltage band 128, the third pre-determined voltage band 130, and the fourth pre-determined voltage band 132 are by-passed, or a fourth terminal voltage if operations 240, 276(*a*), 276(*b*), or 276(*c*) are performed.

At decision block 262(*d*), the operational flow 200 includes determining whether the cycle count 174 is equal to zero. If the cycle count 174 is equal to zero, the operational flow 200 proceeds to decision block 264(*d*). Decision block 264(*d*) includes determining whether a second voltage drop that is based at least in part upon a difference between the third terminal voltage (e.g., from operations 240, 276(*a*), 276(*b*), or 276(*c*)) and the terminal voltage from operation 260(*d*) is greater than the fifth pre-determined threshold voltage drop 162. In some embodiments, the fifth pre-determined threshold voltage drop 162 is 40 mV. If the second voltage drop is greater than the fifth pre-determined threshold voltage drop 162 (e.g., $V_d$>40 mV), then the operational flow 200 proceeds to operation 266(d). At operation 266(d), the operational flow 200 includes confirming that the first battery 106 corresponds to the first battery type (e.g., an alkaline battery). If the second voltage drop is less than the fifth pre-determined threshold voltage drop 162 (e.g., $V_d$<40 mV), then the operational flow 200 proceeds to operation 268(d). At operation 268(d), the operational flow 200 includes confirming that the first battery 106 corresponds to a second battery type (e.g., lithium battery).

Returning to decision block 262(d), if the cycle count 174 is not equal to zero (i.e., operation 276(c) is not performed), the operational flow 200 proceeds to decision block 270(d). Decision block 270(d) includes determining whether a first voltage drop that is based at least in part upon a difference between the first terminal voltage from operation 202 and the second voltage drop from operation 260(d) is greater than the fifth pre-determined threshold voltage drop 162. If the first voltage drop is greater than the fifth pre-determined threshold voltage drop 162 (e.g., $V_d$>40 mV), then the operational flow 200 proceeds to operation 272(d). At operation 272(d), the operational flow 200 includes considering that the first battery 106 corresponds to the first battery type (e.g., an alkaline battery). If the first voltage drop is less than the fifth pre-determined threshold voltage drop 162 (e.g., $V_d$<40 mV), then the operational flow 200 proceeds to operation 274(d). At operation 274(d), the operational flow 200 includes considering that the first battery 106 corresponds to a second battery type (e.g., lithium battery).

After operational flow 200 proceeds through either operation 272(d) or 274(d), the operational flow 200 then proceeds to operation 276(d). Operation 276(d) includes measuring a subsequent terminal voltage of the first battery 106. If the operational flow 200 proceeds through the fifth pre-determined voltage band 134, the subsequent terminal voltage measured in operation 276(d) of the first battery 106 is the third terminal voltage measured. However, as discussed above, if it is determined in decision block 242(d) that the first terminal voltage of the first battery 106 does not fall within the fifth pre-determined voltage band 134, then the operational flow 200 may proceed to decision block 242(e) without measuring the subsequent terminal voltage in operation 276(d).

Figure 6:
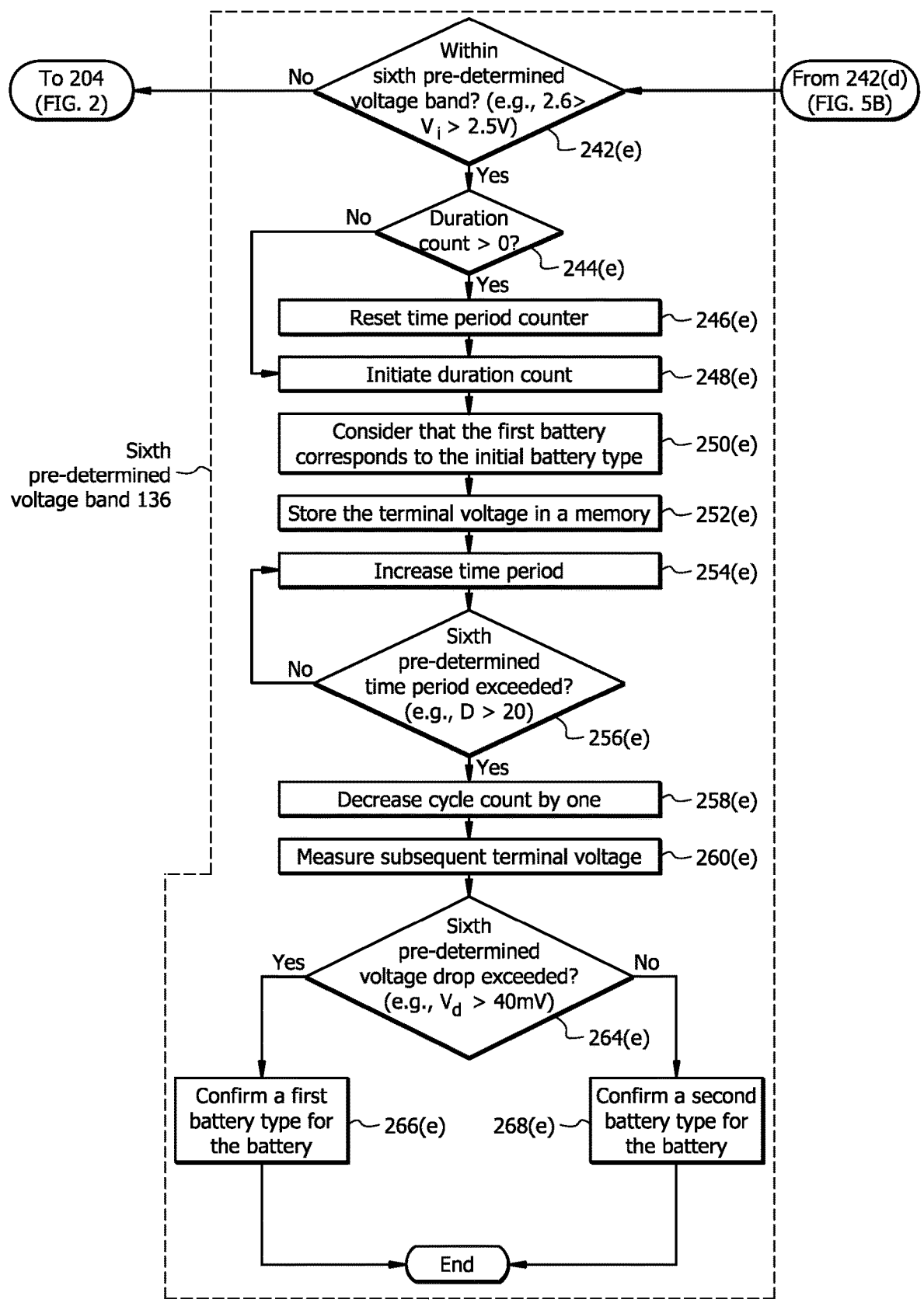
FIG. 6 illustrates a continuation of the flowchart from FIG. 5B.

Referring to FIG. 6, at decision block 242(e), the operational flow 200 includes determining whether the first terminal voltage or the third terminal voltage (e.g., measured in operations 240, 276(a), 276(b), 276(c), or 276(d)) of the first battery 106 corresponds to the sixth pre-determined voltage band 136. For example, the sixth pre-determined voltage band 136 may comprise a sixth range of voltages. In one non-liming example, the sixth range of voltages may comprise voltages between 2.5 to 2.6V. If the first terminal voltage or the third terminal voltage (measured in operations 240, 276(a), 276(b), 276(c), 276(d)) of the first battery 106 does not fall within the sixth range of voltages, then the operational flow 200 proceeds to decision block 204 in FIG. 1. If the first terminal voltage or the third terminal voltage (measured in operations 240, 276(a), 276(b), 276(c), or 276(d)) of the first battery 106 does fall within the sixth range of voltages, the operational flow 200 may proceed to decision block 244(e).

In decision block 244(e), the operational flow 200 includes determining if the duration count 176 is greater than zero. If the duration count 176 is greater than zero, the operational flow 200 proceeds to operation 246(e) to reset the duration count 176 to zero. If the duration count 176 is equal to zero, the operational flow skips operation 246(e) and proceeds to operation 248(e). At operation 248(e), the operational flow 200 initiates the duration count 176 for the sixth pre-determined voltage band 136 and proceeds to operation 250(e). At operation 250(d), the operational flow 200 includes making an assumption for the battery type of the first battery 106. For example, operation 250(d) may include considering that the first battery 106 corresponds to an initial battery type (e.g., consider the first battery 106 as being an alkaline battery). The operational flow 200 may proceed to operation 252(2), where the first terminal voltage or the subsequent terminal voltage (measured in operation 276(c)) is stored in the memory 122 within the terminal voltage data 170. The operational flow 200 proceeds to operation 254(c), which includes increasing the duration count 176.

At decision block 256(e), the operational flow 200 includes determining if the sixth pre-determined time period 150 is exceeded. For example, decision block 256(e) may include comparing the duration count 176 to the sixth pre-determined time period 150 for the sixth pre-determined voltage band 136. In some embodiments, the sixth pre-determined time period 150 for the sixth pre-determined voltage band 136 is set to at least twenty days. If the duration count 176 exceeds the sixth pre-determined time period 150, the operational flow 200 proceeds to operation 258(e). If the duration count 176 is less than the sixth pre-determined time period 150, decision block 256(c) returns the operational flow 200 to operation 254(e) to increase the duration count 176. At operation 258(e), the operational flow 200 includes decreasing the cycle count 174 by 1. At operation 260(e), the operational flow 200 includes measuring a subsequent terminal voltage for the first battery 106.

Decision block 264(d) includes determining whether a second voltage drop that is based at least in part upon a difference between the third terminal voltage (e.g., from operations 240, 276(a), 276(b), 276(c), 276(d)) and the terminal voltage from operation 260(e) is greater than the sixth pre-determined threshold voltage drop 164. In some embodiments, the sixth pre-determined threshold voltage drop 164 is 40 mV. If the second voltage drop is greater than the sixth pre-determined threshold voltage drop 164 (e.g., $V_d$>40 mV), then the operational flow 200 proceeds to operation 266(e). At operation 266(e), the operational flow 200 includes confirming that the first battery 106 corresponds to the first battery type (e.g., an alkaline battery). If the second voltage drop is less than the sixth pre-determined threshold voltage drop 164 (e.g., $V_d$<40 mV), then the operational flow 200 proceeds to operation 268(e). At operation 268(e), the operational flow 200 includes confirming that the first battery 106 corresponds to a second battery type (e.g., lithium battery).

Exemplary Use Cases

In one non-limiting example use case, the operational flow 200 may be repeated to determine a battery type for a second battery 107 in the device 102. For example, the operational flow 200 may include measuring a fifth terminal voltage of the second battery 107 using the voltage sensor circuit 112 at operation 202. The operational flow 200 may compare the fifth terminal voltage of the second battery 107 to at least the plurality of pre-determined voltage bands 124 to determine that the fifth terminal voltage corresponds to the third pre-determined voltage band 130 in operation 242(b). In operation 244(b), the operational flow 200 may determine that the duration count 176 is equal to zero and may proceed to operation 248(b) to initiate the duration count 176. The operational flow 200 may proceed to operation 250(b). At operation 250(b), the operational flow 200 includes making an assumption for the battery type of the second battery 107. For example, operation 250(b) may include considering that the second battery 107 corresponds to an initial battery type (e.g., consider the first battery 106 as being an alkaline battery). The operational flow 200 may proceed to operation 252(b), where the fifth terminal voltage is stored in the memory 122 within the terminal voltage data 170.

The operational flow 200 proceeds to operation 254(b), which includes increasing the duration count 176. Once the third pre-determined time period 144 is exceeded in decision block 256(b), the operational flow 200 proceeds to decrease the cycle count by 1 in operation 258(b) and measure a sixth terminal voltage of the second battery 107 in operation 260(b). The operational flow 200 may proceed to operational flow 262(b), where it is determined that the cycle count is greater than 0 and as a result the operational flow 200 proceeds to decision block 270(b). In decision block 270(b), the operational flow 200 may determine whether a third voltage drop that is based on a difference between the sixth terminal voltage and the fifth terminal voltage is greater than the third pre-determined threshold voltage drop 158. For example, in decision block 270(b) the operational flow 200 may include comparing the third terminal voltage drop to the third pre-determined threshold voltage drop 158. If the third terminal voltage drop for the second battery 107 is greater than the third pre-determined threshold voltage drop 158, at operation 272(b) the operational flow 200 may consider that the second battery 107 corresponds to a first battery type (e.g., alkaline battery). If the third terminal voltage drop for the second battery 107 is less than the third pre-determined threshold voltage drop 158, at operation 274(b) the operational flow 200 may consider that the second battery 107 corresponds to a first battery type (e.g., alkaline battery).

The operational flow 200 proceeds to operation 276(b) where a seventh terminal voltage of the second battery 107 is measured. The operational flow 200 proceeds to operation 242(c) The operational flow 200 may compare the seventh terminal voltage of the second battery 107 to at least the plurality of pre-determined voltage bands 124 to determine that the fifth terminal voltage corresponds to the fourth pre-determined voltage band 132 in operation 242(c). In operation 244(c), the operational flow 200 may determine that the duration count 176 is greater than zero and may proceed to operation 246(c) reset the duration count and then in operation 248(c), the operational flow may initiate the duration count 176. The operational flow 200 may proceed to operation 250(c). At operation 250(c), the operational flow 200 includes making an assumption for the battery type of the second battery 107. For example, operation 250(b) may include considering that the second battery 107 corresponds to an initial battery type (e.g., consider the first battery 106 as being an alkaline battery). The operational flow 200 may proceed to operation 252(c), where the seventh terminal voltage is stored in the memory 122 within the terminal voltage data 170.

The operational flow 200 proceeds to operation 254(c), which includes increasing the duration count 176. Once the fourth pre-determined time period 146 is exceeded in decision block 256(c), the operational flow 200 proceeds to decrease the cycle count by 1 in operation 258(c) and measure an eighth terminal voltage of the second battery 107 in operation 260(c). The operational flow 200 may proceed to operational flow 262(c), where it is determined that the cycle count is equal to 0 and as a result the operational flow 200 proceeds to decision block 270(c). In decision block 264(c), the operational flow 200 may determine whether a fourth voltage drop that is based on a difference between the eighth terminal voltage and the seventh terminal voltage is greater than the fourth pre-determined threshold voltage drop 160. For example, in decision block 266(c) the operational flow 200 may include comparing the fourth terminal voltage drop to the fourth pre-determined threshold voltage drop 160. If the fourth terminal voltage drop for the second battery 107 is greater than the fourth pre-determined threshold voltage drop 160, at operation 266(c) the operational flow 200 may confirm that the second battery 107 corresponds to a first battery type (e.g., alkaline battery). If the fourth terminal voltage drop for the second battery 107 is less than the fourth pre-determined threshold voltage drop 160, at operation 274(c) the operational flow 200 may confirm that the second battery 107 corresponds to a first battery type (e.g., alkaline battery).

In one non-limiting example use case, the operational flow 200 may be repeated to determine a battery type for a third battery 108 in the device 102. For example, the operational flow 200 may include measuring a ninth terminal voltage of the third battery 108 in operation 202 using the voltage sensor circuit 112. The operational flow 200 may include in decision block 204 comparing the ninth terminal voltage of the third battery 108 to a first initial voltage threshold 166 and a second initial voltage threshold 168 in decision block 208. If the ninth terminal voltage is less than the first initial voltage threshold 166, the operational flow 200 may confirm that the third battery 108 corresponds to a first battery type (e.g., alkaline battery) based upon the comparison between the ninth terminal voltage and the first initial voltage threshold 166. If the ninth terminal voltage is greater than the second initial voltage threshold 168, the operational flow 200 may confirm that the third battery 108 corresponds to a second battery type (e.g., lithium battery) based upon the comparison between the ninth terminal voltage and the second initial voltage threshold 168.

The invention claimed is:

1. A system for determining a battery type for one or more batteries in a device, the system comprising:
the device configured to receive power from the one or more batteries, wherein the one or more batteries comprise at least a first battery;
a voltage sensor circuit configured to measure a terminal voltage for the one or more batteries;
a memory operable to store:
a plurality of pre-determined voltage bands, the plurality of pre-determined voltage bands comprising a first pre-determined voltage band that comprises a first range of voltages and a second pre-determined voltage band that comprises a second range of voltages;
a plurality of pre-determined time periods, the plurality of pre-determined time periods comprising a first pre-determined time period for the first pre-determined voltage band and a second pre-determined time period for the second pre-determined voltage band;
a plurality of pre-determined threshold voltage drops, the plurality of pre-determined threshold voltage drops comprising a first pre-determined threshold voltage drop for the first pre-determined voltage band and a second pre-determined threshold voltage drop for the second pre-determined voltage band; and a processor operably coupled to the voltage sensor circuit and the memory, wherein the processor is configured to:
measure a first terminal voltage of the first battery using the voltage sensor circuit;
compare the first terminal voltage to at least a first one of the plurality of pre-determined voltage bands;
determine that the first terminal voltage corresponds to the first pre-determined voltage band based at least in part upon the comparison;
measure a second terminal voltage of the first battery using the voltage sensor circuit after the first pre-determined time period for the first pre-determined voltage band;
determine a first voltage drop based at least in part upon a difference between the first terminal voltage and the second terminal voltage;
compare the first voltage drop for the first pre-determined voltage band to the first pre-determined threshold voltage drop;
determine an initial battery type of the first battery based at least in part upon the comparison of the first voltage drop to the first pre-determined threshold voltage drop;
measure a third terminal voltage of the first battery using the voltage sensor circuit;
compare the third terminal voltage of the first battery to at least a second one of the plurality of pre-determined voltage bands;
determine that the third terminal voltage of the first battery corresponds to the second pre-determined voltage band based at least in part upon the comparison;
measure a fourth terminal voltage of the first battery after the second pre-determined time period for the second pre-determined voltage band;
determine a second voltage drop based at least in part upon a difference between the third terminal voltage and the fourth terminal voltage;
compare the second voltage drop for the second pre-determined voltage band to the second pre-determined threshold voltage drop; and
confirm the battery type for the first battery based at least in part upon the initial battery type and the comparison of the second voltage drop to the second pre-determined threshold voltage drop.

2. The system of claim 1, wherein the first pre-determined time period for the first pre-determined voltage band is at least two days, and the second pre-determined time period for the second pre-determined voltage band is at least seven days.

3. The system of claim 1, wherein the processor is further configured to:
determine that the first battery corresponds to a first battery type if the first voltage drop is greater than the first pre-determined threshold voltage drop, and
confirm that the first battery corresponds to the first battery type if the second voltage drop is greater than the second pre-determined threshold voltage drop.

4. The system of claim 3, wherein the processor is further configured to:
confirm that the first battery type corresponds to an alkaline battery if the second voltage drop is greater than the second pre-determined threshold voltage drop.

5. The system of claim 1, wherein the processor is further configured to:
determine that the first battery corresponds to a second battery type if the first voltage drop is less than the first pre-determined threshold voltage drop; and
confirm that the first battery corresponds to the second battery type if the second voltage drop is less than the second pre-determined threshold voltage drop.

6. The system of claim 5, wherein the processor is further configured to:
confirm that the second battery type corresponds to a lithium battery if the second voltage drop is less than the second pre-determined threshold voltage drop.

7. The system of claim 1, wherein the one or more batteries comprises a second battery;
wherein the plurality of pre-determined voltage bands further comprises a third pre-determined voltage band that comprises a third range of voltages and a fourth pre-determined voltage band that comprises a fourth range of voltages;
wherein the plurality of pre-determined time periods comprises a third pre-determined time period for the third pre-determined voltage band and a fourth pre-determined time period for the fourth pre-determined voltage band;
wherein the plurality of pre-determined threshold voltage drops comprise a third pre-determined threshold voltage drop for the third pre-determined voltage band and a fourth pre-determined threshold voltage drop for the fourth pre-determined voltage band; and
wherein the processor is configured to:
measure a fifth terminal voltage of the second battery using the voltage sensor circuit;
compare the fifth terminal voltage of the second battery to at least a third one of the plurality of pre-determined voltage bands;
determine that the fifth terminal voltage corresponds to the third pre-determined voltage band based at least in part upon the comparison;
measure a sixth terminal voltage of the second battery using the voltage sensor circuit after the third pre-determined time period for the third pre-determined voltage band;
determine a third voltage drop based at least in part upon a difference between the fifth terminal voltage and the sixth terminal voltage;
compare the third voltage drop for the third pre-determined voltage band to the third pre-determined threshold voltage drop;
determine the initial battery type of the second battery based at least in part upon the comparison of the third voltage drop to the third pre-determined threshold voltage drop;
measure a seventh terminal voltage of the second battery using the voltage sensor circuit;
compare the seventh terminal voltage of the second battery to at least a fourth one of the plurality of pre-determined voltage bands;
determine that the seventh terminal voltage of the second battery corresponds to the fourth pre-determined voltage band based at least in part upon the comparison;
measure an eighth terminal voltage of the second battery after the fourth pre-determined time period for the fourth pre-determined voltage band;
determine a fourth voltage drop based at least in part upon a difference between the seventh terminal voltage and the eighth terminal voltage;

compare the fourth voltage drop for the fourth pre-determined voltage band to the fourth pre-determined threshold voltage drop; and confirm the battery type for the second battery based at least in part upon the initial battery type and the comparison of the second voltage drop to the second pre-determined threshold voltage drop.

8. The system of claim 1, wherein the one or more batteries comprises a second battery, wherein the memory is further operable to store a first initial voltage threshold and a second initial voltage threshold, wherein the processor is further configured to:
measure a fifth terminal voltage of the second battery using the voltage sensor circuit;
compare the fifth terminal voltage to the first initial voltage threshold and the second initial voltage threshold;
determine whether (i) the fifth terminal voltage is less than the first initial voltage threshold and (ii) if the fifth terminal voltage is higher than the second initial voltage threshold; and
confirm that (iii) the second battery corresponds to a first battery type if the fifth terminal voltage is less than the first initial voltage threshold and (iv) the second battery corresponds to a second battery type if the fifth terminal voltage is greater than the second initial voltage threshold.

9. A method for determining a battery type for a first battery in a device, the method comprising:
measuring a first terminal voltage of the first battery using a voltage sensor circuit;
comparing the first terminal voltage to at least a first one of a plurality of pre-determined voltage bands, the plurality of pre-determined voltage bands comprising a first pre-determined voltage band that comprises a first range of voltages and a second pre-determined voltage band that comprises a second range of voltages;
determining that the first terminal voltage corresponds to the first pre-determined voltage band at least based at least in part upon the comparison;
measuring a second terminal voltage of the first battery using the voltage sensor circuit after a first pre-determined time period for the first pre-determined voltage band;
determining a first voltage drop based at least in part upon a difference between the first terminal voltage and the second terminal voltage;
comparing the first voltage drop for the first pre-determined voltage band to a first pre-determined threshold voltage drop;
determining an initial battery type of the first battery based at least in part upon the comparison of the first voltage drop to a first pre-determined threshold voltage;
measuring a third terminal voltage of the first battery using the voltage sensor circuit;
comparing the third terminal voltage of the first battery to at least a second one of the plurality of pre-determined voltage bands;
determining that the third terminal voltage of the first battery corresponds to the second pre-determined voltage band at least based at least in part upon the comparison;
measuring a fourth terminal voltage of the first battery after a second pre-determined time period for the second pre-determined voltage band;
determining a second voltage drop based at least in part upon a difference between the third terminal voltage and the fourth terminal voltage;
comparing the second voltage drop for the second pre-determined voltage band to a second pre-determined threshold voltage drop; and
confirming the battery type for the first battery based at least in part upon the initial battery type and the comparison of the second voltage drop to the second pre-determined threshold voltage drop.

10. The method of claim 9, wherein the first pre-determined time period for the first pre-determined voltage band is at least two days, and the second pre-determined time period for the second pre-determined voltage band is at least seven days.

11. The method of claim 9 further comprising:
determining that the first battery corresponds to a first battery type if the first voltage drop is greater than the first pre-determined threshold voltage drop, and
confirming that the first battery corresponds to the first battery type if the second voltage drop is greater than the second pre-determined threshold voltage drop.

12. The method of claim 11 further comprising:
confirming that the first battery type corresponds to an alkaline battery if the second voltage drop is greater than the second pre-determined threshold voltage drop.

13. The method of claim 9 further comprising:
determining that the first battery corresponds to a second battery type if the first voltage drop is less than the first pre-determined threshold voltage drop; and
confirming that the first battery corresponds to the second battery type if the second voltage drop is less than the second pre-determined threshold voltage drop.

14. The method of claim 13 further comprising:
confirming that the first battery corresponds to a lithium battery if the second voltage drop is less than the second pre-determined threshold voltage drop.

15. A non-transitory computer readable medium storing instructions that when executed by a processor cause the processor to:
measure a first terminal voltage of a first battery in a device using a voltage sensor circuit;
compare the first terminal voltage to at least a first one of a plurality of pre-determined voltage bands, the plurality of pre-determined voltage bands comprising a first pre-determined voltage band that comprises a first range of voltages and a second pre-determined voltage band that comprises a second range of voltages;
determine that the first terminal voltage corresponds to the first pre-determined voltage band based at least in part upon the comparison;
measure a second terminal voltage of the first battery using the voltage sensor circuit after a first pre-determined time period for the first pre-determined voltage band; and
determine a first voltage drop based at least in part upon a difference between the first terminal voltage and the second terminal voltage;
compare the first voltage drop for the first pre-determined voltage band to a first pre-determined threshold voltage drop;
determine an initial battery type of the first battery based at least in part upon the comparison of the first voltage drop to a first pre-determined threshold voltage;
measure a third terminal voltage of the first battery using the voltage sensor circuit;

compare the third terminal voltage of the first battery to at least a second one of the plurality of pre-determined voltage bands;

determine that the third terminal voltage of the first battery corresponds to the second pre-determined voltage band at least based at least in part upon the comparison;

measure a fourth terminal voltage of the first battery after a second pre-determined time period for the second pre-determined voltage band;

determine a second voltage drop based at least in part upon a difference between the third terminal voltage and the fourth terminal voltage;

compare the second voltage drop for the second pre-determined voltage band to a second pre-determined threshold voltage drop; and confirm a battery type for the first battery based at least in part upon the initial battery type and the comparison of the second voltage drop to the second pre-determined threshold voltage drop.

16. The non-transitory computer readable medium of claim 15, wherein the first pre-determined time period for the first pre-determined voltage band is at least two days, and the second pre-determined time period for the second pre-determined voltage band is at least seven days.

17. The non-transitory computer readable medium of claim 15, wherein when the instructions are executed by the processor cause the processor to:

determine that the first battery corresponds to a first battery type if the first voltage drop is greater than the first pre-determined threshold voltage drop, and confirm that the first battery corresponds to the first battery type if the second voltage drop is greater than the second pre-determined threshold voltage drop.

18. The non-transitory computer readable medium of claim 17, wherein when the instructions are executed by the processor cause the processor to:

confirm that the first battery corresponds to an alkaline battery if the second voltage drop is greater than the second pre-determined threshold voltage drop.

19. The non-transitory computer readable medium of claim 15, wherein when the instructions are executed by the processor cause the processor to:

determine that the first battery corresponds to a second battery type if the first voltage drop is less than the first pre-determined threshold voltage drop; and confirm that the first battery corresponds to the second battery type if the second voltage drop is less than the second pre-determined threshold voltage drop.

20. The non-transitory computer readable medium of claim 19, wherein when the instructions are executed by the processor cause the processor to:

confirm that the first battery corresponds to a lithium battery if the second voltage drop is less than the second pre-determined threshold voltage drop.

* * * * *